United States Patent

Choi

[11] 4,064,018
[45] Dec. 20, 1977

[54] INTERNALLY CIRCULATING FAST FLUIDIZED BED FLASH PYROLYSIS REACTOR

[75] Inventor: Charles K. Choi, Claremont, Calif.

[73] Assignee: Occidental Petroleum Corporation, Los Angeles, Calif.

[21] Appl. No.: 700,000

[22] Filed: June 25, 1976

[51] Int. Cl.² .................. C10B 1/04; C10B 49/16; C10B 49/22; C10G 1/02
[52] U.S. Cl. .................................. 201/12; 48/210; 201/21; 201/22; 201/23; 201/25; 201/28; 201/31; 202/99; 202/120; 208/8; 208/11 R
[58] Field of Search ............... 201/7, 8, 10, 12, 21–23, 201/25, 28, 30–32, 34; 202/99, 108, 120, 121; 48/210; 208/8, 11 R

[56] References Cited

U.S. PATENT DOCUMENTS

| | | | |
|---|---|---|---|
| 2,582,712 | 1/1952 | Howard | 201/28 X |
| 2,607,666 | 8/1952 | Martin | 202/120 X |
| 2,709,675 | 5/1955 | Phinney | 201/31 |
| 3,607,158 | 9/1971 | Dent et al. | 48/210 |
| 3,855,070 | 12/1974 | Squires | 201/31 X |

Primary Examiner—Joseph Scovronek
Attorney, Agent, or Firm—Christie, Parker & Hale

[57] ABSTRACT

Solid carbonaceous materials are pyrolyzed by feeding the carbonaceous material along with a particulate source of heat to a fast fluidized bed contained within a vertically disposed duct. An internally circulating stream of spent particulate source of heat and carbon containing solid residue of the pyrolysis of the carbonaceous material flows upwardly along the inner surface of the duct, thereby preventing carbonaceous material from caking on the duct.

34 Claims, 2 Drawing Figures

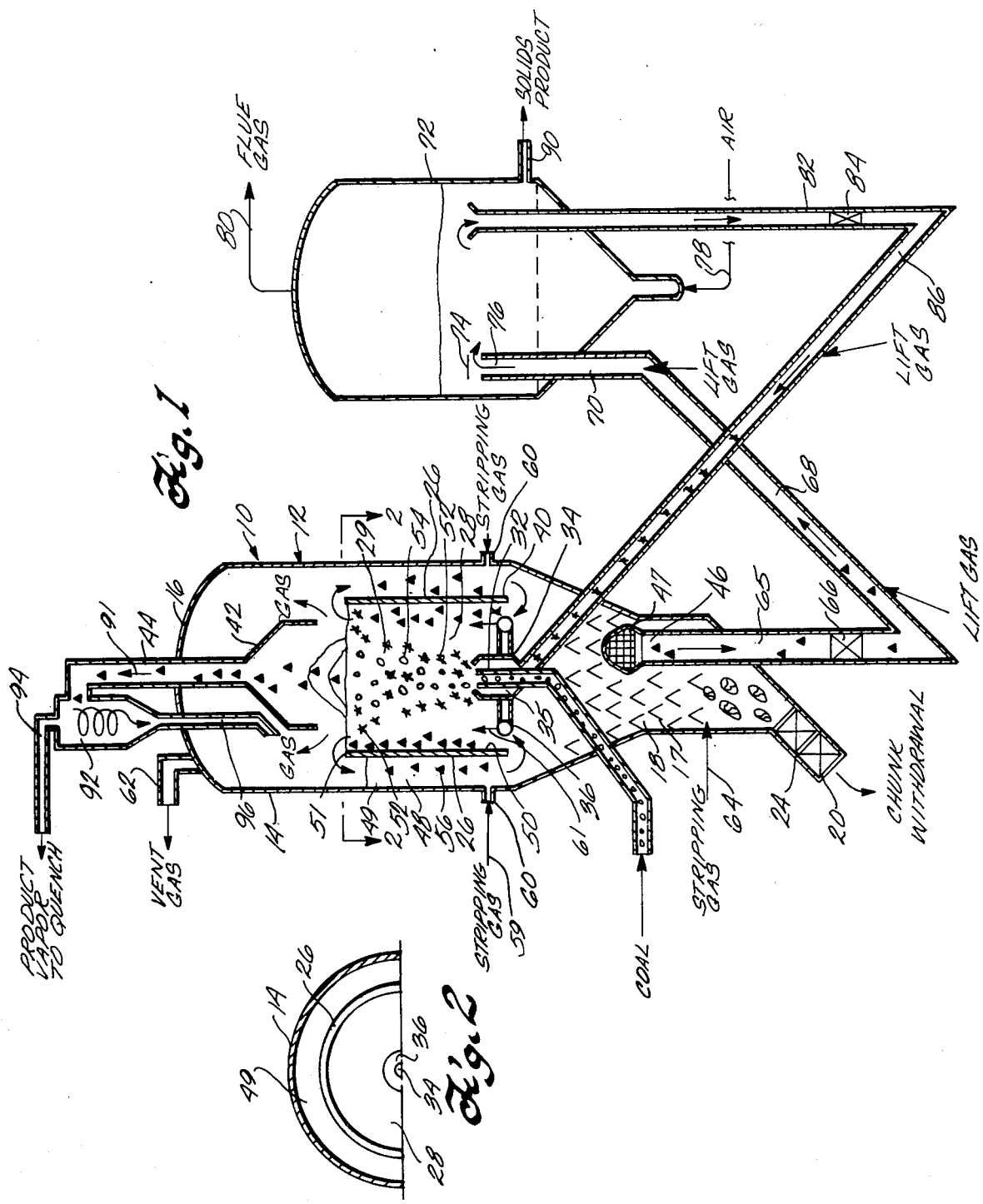

INTERNALLY CIRCULATING FAST FLUIDIZED BED FLASH PYROLYSIS REACTOR

BACKGROUND OF THE INVENTION

Due to increasing scarcity of fluid fossil fuels such as oil and natural gas, much attention is being directed towards converting solid carbonaceous materials such as coal, oil shale, and solid waste to liquid and gaseous hydrocarbons by pyrolyzing the solid carbonaceous material. Typically, pyrolysis occurs under nonoxidizing conditions in the presence of a particulate source of heat.

In the past, pyrolysis has been carried out in reactors with long pyrolysis times. These reactors provide a yield of middle boiling hydrocarbons, i.e., $C_5$ hydrocarbons to hydrocarbons having an end point of about 950° F, less than desired. The middle boiling point hydrocarbons are useful for the production of gasoline, diesel fuel, heating fuel, and the like. Their loss has been attributed to protracted effective pyrolysis times which result in thermal cracking of such hydrocarbons.

Use of tubular reactors providing a short pyrolysis time results in increased yield of middle distillates. However, a disadvantage of using a tubular reactor for pyrolysis is a caking or agglomeration problem. Experience with agglomerative coals, particularly Eastern United States coals, indicates that these coals pass through a "tacky" stage during which the coal particles have a tendency to agglomerate in a tubular reactor, especially along the walls of the reactor.

A need exists therefore for a more efficient pyrolysis process and a more efficient pyrolysis reactor which maximizes the yield of the middle boiling hydrocarbons and which prevents agglomerative carbonaceous materials from caking along the walls of the reactor.

SUMMARY OF THE INVENTION

According to the present invention there is provided a process for the pyrolysis of solid carbonaceous materials and an apparatus used therefor with the above features.

In the process of this invention carbonaceous material contained in a carrier gas which is nondeleteriously reactive with respect to pyrolysis products is introduced to the base of an upwardly flowing fast fluidized bed. Simultaneously there is introduced to the base of the fast fluidized bed a particulate source of heat which contacts and pyrolyzes the carbonaceous material. The introduced quantity of particulate source of heat is sufficient to raise the carbonaceous material to a pyrolysis temperature of at least about 600° F. The pyrolysis of the carbonaceous material yields a particulate carbon containing solid residue and a pyrolytic vapor containing hydrocarbons.

The fast fluidized bed is contained in a substantially vertically disposed open duct. The open duct is at least partially surrounded by a descending dense fluidized mass of particulate solids including particulate carbon containing solid residue of pyrolysis and spent particulate source of heat. Simultaneously with the introduction of the carbonaceous material and particulate source of heat, a flow of solids from the dense fluidized mass is maintained upwardly along the inner surface of the duct to prevent contact of the carbonaceous material with the inner surface of the duct. Preferably, this flow of solids along the inner surface of the duct is maintained by discharging into the base of the duct upwardly along its inner surface a fluidizing gas which is nondeleteriously reactive with respect to pyrolysis products.

At least a portion of the spent particulate source of heat and particulate carbon containing solid residue resulting from pyrolysis are discharged over the top edge of the duct to the descending dense fluidized mass of particulate solids around the outside of the duct.

In addition, a stream containing a gaseous mixture of the carrier gas and pyrolytic vapor and entrained solids including particulate source of heat and carbon containing solid residue is discharged from the upper portion of the duct and through an outlet above the fast fluidized bed. The gaseous mixture is separated from the entrained solids mixture, and the hydrocarbons are recovered from the gaseous mixture. The separated entrained solids mixture is cycled back to the pyrolysis reactor.

The dense fluidized mass is maintained along the outer surface of the duct by contacting spent particulate source of heat and carbon containing solid residue discharged over the top edge of the duct with an ascending stream of a stripping gas which is nondeleteriously reactive with respect to pyrolysis products. This stripping gas also serves to strip hydrocarbons from the solids mixture in the dense fluidized bed, thereby increasing the yield of hydrocarbon product.

Preferably the weight ratio of the fluidized solids mixture passing upwards along the inner surface of the duct to carbonaceous material introduced to the fast fluidized bed is above about 6 to prevent agglomeration on the reactor walls and less than about 40 for economy of operation.

In the process of the invention, pyrolysis occurs at a temperature from about 600° to about 2000° F. Short reaction times and low temperatures in the fast fluidized bed enhance formation of middle distillate hydrocarbons, i.e., hydrocarbons in the range of C hydrocarbons to hydrocarbons having an end point of 950° F. As a consequence, it is preferred to conduct pyrolysis at pyrolysis times of less than about 5 seconds, and more preferably from about 0.1 to about 3 seconds, and at a temperature of from about 900° to about 1400° F.

To achieve pyrolysis the solid particulate source of heat generally is introduced at a temperature from about 100° to about 500° F higher than the pyrolysis temperature to be achieved. The weight ratio of the particulate source of heat to the carbonaceous feed ranges from about 2 to about 20:1. In a version of this invention, the heat load on the particulate source of heat is reduced by heating the dense fluidized mass which supplies the particles for the layer along the inner surface of the duct.

Particles of the solid pyrolysis product and particulate source of heat not fluidizable in the fast fluidized bed are collected in a stripping zone. The stripping zone is below and communicates with the fast fluidized bed. In order to obtain improved yields hydrocarbons preferably are stripped from particles in the stripping zone with a stripping gas which is nondeleteriously reactive with respect to pyrolysis products. This stripping gas passes through the stripping zone, into the fast fluidized bed, and out through the outlet above the fast fluidized bed for recovery of the hydrocarbons recovered from the particles in the stripping zone.

Two streams of solids are removed from the stripping zone. A first stream of large chunks is removed from the bottom of the stripping zone. A second stream of smaller particles consisting of spent particulate source of heat and carbon containing solid residue is withdrawn as product. A portion of this stream can be passed to a combustion zone where the carbon containing solid residue is at least partially oxidized to form the particulate source of heat for feed to the fast fluidized bed.

The apparatus employed to carry out the process of this invention is a pyrolysis reactor comprising a vertically oriented outer vessel. Inside the vessel and in spaced relationship therefrom is an open, substantially vertically disposed duct. Between the duct and the outer vessel is a substantially vertically disposed passageway.

Two solids inlets are provided at the base of the duct and in open communication therewith. These inlets are laterally spaced apart from the duct. Means are provided for introducing a particulate carbonaceous material to undergo pyrolysis to one of the two solids inlets and means are provided for introducing a particulate source of heat to pyrolyze the carbonaceous material to the other solids inlet. There is a gas inlet around and preferably surrounding the solids inlets. This gas inlet, which is in open communication with the base of the duct, receives a fluidizing gas which fluidizes a layer of particulate solids moving along the inner surface of the conduit. This layer of solids, which enters the duct at its base from the passageway between the duct and the outer vessel, prevents the carbonaceous material from contacting and agglomerating against the inner surface of the duct. Means are provided for introducing a stripping gas to flow upwardly through the passageway to fluidize solids descending through the passageway between the duct and outer vessel towards the base of the duct to be fluidized therein by the fluidizing gas introduced to the fluidizing gas inlet. An outlet is provided above the duct for withdrawal of pyrolytic vapors from the outer vessel, and there is another outlet below the duct for withdrawal of carbon containing solid residue. The outlet above the duct preferably is a vertically oriented hood which tapers inwardly away from the duct to minimize the residence time of the pyrolytic vapor in the reactor.

When it is desired to strip hydrocarbons from the particulate carbon containing solids residue and carbonaceous material not fluidizable in the fast fluidized bed, a stripping chamber is provided below the duct as well as an inlet for passing a stripping gas through the stripping chamber. Outlet means are provided at the bottom of the stripping chamber for withdrawing large stripped solids from the stripping chamber.

When carbon containing solid residue is oxidized to provide heat for the pyrolysis reaction, means are provided for transferring solids withdrawn via the outlet below the duct to a combustion chamber where the carbon containing solid residue is at least partially oxidized to form particulate source of heat. Means are provided for passing a source of oxygen into the combustion chamber and for transferring the particulate source of heat from the combustion chamber to a solids inlet at the base of the duct.

The vapors removed from the outlet above the fast fluidized bed contain entrained solids. Means such as a cyclone are provided for separating the vapors from the entrained solids as well as connection means to transfer the vapors to the separation means and means for transferring the entrained solids from the separation means back to the passageway between the duct and the outer vessel.

In order to obtain immediate intimate contact between the source of heat and carbonaceous material as the carbonaceous material enters the duct, the inlet for the carbonaceous material preferably is a first tube and the inlet for the particulate source of heat is an annular region between the outer wall of the first tube and the inner wall of a second tube which surrounds and is coaxial with the first tube.

The process and pyrolysis reactor of this invention solve the problems associated with prior art reactors discussed above. Because a carbonaceous material and hot solid particles are injected into a fast fluidized bed where heat transfer and the pyrolysis reaction take place within a short period of time, increased yield of the middle boiling hydrocarbons results. Because there is an internally circulating fluid bed containing particulate source of heat and carbon containing solid residue along the inner surface of the duct surrounding the fast fluidized bed, carbonaceous material agglomeration on the duct is prevented.

These and other features, aspects and advantages of the present invention will become more apparent with reference to the following drawings, detailed description of the invention, and appended claims.

DRAWINGS

FIG. 1 illustrates in section an overall apparatus employed to carry out the process of this invention; and FIG. 2 is a top view of the pyrolysis reactor of FIG. 1 along lines 2—2 in FIG. 1.

DESCRIPTION OF THE INVENTION

According to the present invention there is provided a process and an apparatus for the pyrolysis of solid carbonaceous materials which can be used to maximize the yield of middle distillate hydrocarbons by short pyrolysis contact times and to prevent agglomeration of the carbonaceous material.

The solid carbonaceous materials which are pyrolyzed in accordance with the present invention include tar sands, oil shale, the organic portion of solid waste, nonagglomerative and especially agglomerative coals, and the like, as well as mixtures thereof.

Referring to the drawings, a pyrolysis reactor 10 comprises a vessel 12 having a vertically oriented cylindrical body 14, a domed top 16, and an elongated bottom section 18 which tapers to form a first solids outlet 20 at the bottom of the vessel for removal of large clinkers. There are baffles such as triangular shed type baffles 17 in the bottom section 18 which serves as a stripping chamber. A slide valve 24 is provided at the bottom outlet 20 to control removal of clinkers through the outlet. Within the vessel 12 in the cylindrical body section there is an open, substantially vertically disposed duct 26 defining an inner conduit 28 within the duct. As shown in the drawings, preferably the duct is a cylindrical tube 26 for ease of fabrication. Above the conduit 28 inside the duct 26 there is a vertically oriented conical collector or hood 42 which tapers or necks down inwardly away from the duct to an outlet 44 from the pyrolysis reactor 10.

Two solids inlets are provided for introducing solids into the base 40 of the duct 26. The first solids inlet is a first conduit such as a tube 32 used for introducing carbonaceous material upwardly into the duct to form a fast fluidized bed 29. This first inlet is laterally spaced apart from the duct. The second solids inlet, which is for introducing the particulate source of heat, is a passageway 35 between the first tube 32 and a second conduit such as tube 34. This second tube 34 preferably is coaxial with and surrounds the first solids inlet 32, to ensure immediate intimate contact between the particulate source of heat and the carbonaceous material. In this preferred configuration, the passageway 35 is annular.

In the Drawings, the particulate source of heat is shown as being introduced to fast fluidized bed 29 through the annulus 35 surrounding the first inlet tube 32. This configuration can be reversed with the carbonaceous material being introduced through the annular region 35 and the particulate source of heat being introduced through the first tube 32. However, this latter configuration is not as desirable since the carbonaceous material is more likely to impinge on the inner wall 50 of the duct 26 and avoid contacting the particulate source of heat.

The reactor is designed to prevent caking of the carbonaceous material on the inner wall of the duct. To this end, preferably the ratio of the diameter of the duct to the diameter of the solids inlet used for introducing carbonaceous material into the duct is at least about 5:1 to prevent the carbonaceous material from caking on the walls of the duct. At a ratio of diameters of less than about 5:1, incoming carbonaceous material is more likely to impinge on the reactor wall, which can lead to caking. The ratio of the diameter of the duct to the diameter of the solids inlet used for introducing carbonaceous material into the duct preferably is less than about 10:1 for economical sizing of the equipment.

To further prevent caking, preferably the solids inlet for the carbonaceous material is coaxial with the duct. If the inlet were eccentrically positioned relative to the duct, a portion of the carbonaceous material would have a shorter distance to travel to the inner wall of the duct compared to the distance to travel with a centrally located inlet, where all particles have the same distance to travel to reach the inner wall of the duct. Also because the carbonaceous material is introduced upwardly into the duct, impingment of the carbonaceous material on the inner wall 50 of the duct 26 is prevented.

Below the fast fluidized bed 29 towards the top of the stripping chamber 18 there is a second solids outlet 46 for withdrawal of solids. This outlet 46 is covered by a screen 47 which prevents clinkers from plugging the outlet.

In an annular passageway 49 between the vertical wall 22 and the wall of the vessel 12 there is a descending dense fluidized mass comprising solids passing over the top edge of the duct. At least a portion of the dense fluidized mass is fluidized upwardly along the inner surface 50 of the duct 26 by the fluidizing gas discharged by the sparger ring 36.

A carbonaceous material contained in a carrier gas is introduced through the first inlet 32 upwardly into the fast fluidized bed 29. The carrier gas is nondeleteriously reactive with respect to the products of pyrolysis and serves as a diluent to minimize pyrolysis contact time and to dilute the carbonaceous material to prevent self-agglomeration. As used herein, by a "nondeleteriously reactive" gas there is meant a gas stream which is essentially free of free oxygen. Although constituents of the gas may react with pyrolysis products to upgrade their value, to be avoided are constituents which degrade pyrolysis products. The carrier gas may, for instance, be the off-gas product of pyrolysis, steam which will react under suitable conditions with char or coke formed from pyrolysis to yield by a water-gas shift reaction, hydrogen which serves to react with and stabilize unsaturates in the products of pyrolysis, any desired inert gas, or mixtures thereof.

As used herein, the term "fast fluidized bed" is used as it is used in column 6, lines 11 through 17 of U.S. Pat. No. 3,855,070 issued to Squires, incorporated herein by reference. The advantage of using a fast fluidized bed is that intimate mixing can be obtained between the carbonaceous material and the source of heat used to heat the carbonaceous material to its pyrolysis temperature. The solid phase in a fast fluidized bed appears generally to be discontinuous, taking the form of falling streams and ribbons. Much refluxing of solids occurs. The gas which appears to flow upwards in between the solid particles conveys solids upwards. There is a marked gradient in solid density between the bottom and top of the fluidized bed 29, the density being greater at the bottom. The lighter solid particles are carried upward out of the fluidized bed by the upwardly flowing gas while the heavier denser particles tend to drop downwards into the stripping chamber 18 below the fluidized bed 29.

In order to obtain a fast fluidized bed, gas velocities of from about 5 to about 50 feet per second are required in the bed. Since the cross-sectional area of the inlet 32 for the carbonaceous material is less than the cross-sectional area of the fluidized bed, it is necessary that the velocities in the first solids inlet 32 be higher than the velocities in the fluidized bed.

The carbonaceous material may be treated before it is fed to the fast fluidized bed by processes such as removal of inorganic fractions by magnetic separation and classification, particularly in the case of municipal waste. The carbonaceous material also can be dried to reduce its moisture content. The solid carbonaceous material usually is comminuted to increase the surface area available for the pyrolysis reaction.

Simultaneously with the introduction of the carbonaceous material there is introduced a particulate source of heat and its carrier gas which is non-deleteriously reactive with respect to pyrolysis products into the fast fluidized bed through the second solids inlet 35. The particles of the particulate source of heat, which are represented by the stars 52 in FIG. 1, contact the carbonaceous material represented by the circles 54 in FIG. 1, thereby transferring heat from the particulate source of heat to the carbonaceous material. This heat transfer instantaneously causes pyrolysis which is a combination of vaporization and cracking reactions. As the vaporization and cracking reactions occur, a pyrolytic vapor containing volatilized hydrocarbons is generated from the carbonaceous material with an attendant production of a carbon containing solid residue such as coke or char. The volatilized hydrocarbons produced by pyrolysis consist of condensible hydrocarbons which may be recovered by simply contacting the volatilized hydrocarbons with condensation means, and non-condensible hydrocarbons, such as methane and other hydrocarbon gases which are not recoverable by ordinary condensation means. An effective pyrolysis contact time in the fast fluidized bed is less than about 5 seconds, and preferably from about 0.1 to about 3 second to maximize yield of the middle distillates. The term "pyrolysis time" means the average residence time of the carrier gas in the fast fluidized bed.

Although the duct 26 is shown in FIG. 1 in a vertical position, it is possible to use a duct tilting away from the direction of travel of the carbonaceous material in the fast fluidized bed. This would have the advantage of making it more difficult for the carbonaceous material to contact and cake along the wall. However, this configuration would have the disadvantage of an increase in the cross-sectional area of the fast fluidized bed 29 towards the top of the bed. Thus, gas velocity would tend to decrease towards the top, thereby requiring higher inlet velocities to the fast fluidized bed.

In the preferred version of the reactor where the duct 26 is a cylindrical tube, it is simple to maintain the internally circulating flow of spent particulate source of heat and carbon containing solid residue particles up along the inner surface of the duct and down through the dense fluidized bed along the outer surface of the duct in the passageway.

There is a descending dense fluidized mass comprising a solids mixture of spent particulate source of heat particles having passed through the fast fluidized bed and carbon containing solid residue formed in the fast fluidized bed, represented by triangles 56 in FIG. 1, in the passageway 49. The solids mixture contains particles passing over the top 51 of the duct 26 into the passageway 49 between the duct 26 and the vessel 12. This annular passageway is maintained at minimum fluidization conditions by a small amount of a stripping gas 59 which is nondeleteriously reactive with respect to pyrolysis products. The stripping gas is injected into the passageway via inlets 60 through the vessel wall in open communication with the base of the passageway. As the solids mixture descends through the passageway 49, the ascending stripping gas strips hydrocarbons from the solids. When the descending solids mixture reaches the bottom 40 of the duct, at least a portion of the solids mixture is fluidized upwards by the fluidizing gas stream 61 flowing out of the sparger ring 36. This fluidizing gas, which is nondeleteriously reactive with respect to pyrolysis products, passes the solids mixture upwards along the inner surface 50 of the duct 14, thereby preventing carbonaceous material from contacting and agglomerating on the wall. Once these particles along the inner surface of the vertical wall reach the top of the duct, they tend to pass over the duct and fall back into the dense fluidized mass in the annular passageway between the duct and the vessel body, thereby providing an internally circulating fluidized bed. This internally circulating fluidized bed is maintained by ensuring that the density in the outer annular passageway 49 outside of the duct is greater than the density on the inner surface of the duct. This is controlled by maintaining the annular passageway at minimum fluidization condition by injecting only a small amount of stripping gas 59 into the annular passageway while injecting a comparatively large amount of fluidization gas 61 upwardly through the sparger ring 36. For example, when pyrolyzing coal where heated char is the particulate source of heat and the carbon containing solids residue, a bulk density of about 25 pounds per cubic foot is maintained in the passageway and about 20 pounds per cubic foot along the inner surface of the duct.

The weight ratio of the fluidized solids mixture passing upwards along the inner surface of the passageway 26 to carbonaceous material preferably is greater than about 6. At ratios less than about 6 some of the carbonaceous material may be able to contact the wall and cake thereon. The weight ratio of the fluidized solids mixture to carbonaceous material is usually limited to about 40 because this is adequate to ensure that the carbonaceous material does not contact the reactor walls, and higher weight ratios result in increased energy costs for compressing the stripping gas and fluidizing gas used to generate the internally circulating fluidized bed.

The hot particulate solid is supplied at a rate and a temperature consonant with maintaining a temperature in the fast fluidized bed suitable for pyrolysis. Pyrolysis initiates at about 600° F and may be carried out at temperatures above 2000° F. The maximum temperature of pyrolysis is determined by the temperature at which the inorganic portion of the carbonaceous material or particulate source of heat softens with resultant slag formation. Preferably, pyrolysis is conducted at a temperature from about 900° to about 1400° F to maximize the yield of middle boiling point hydrocarbons. Higher temperatures, by contrast, enhance gasification reactions.

Depending upon pyrolysis temperature, normally from about 2 to about 20 pounds of particulate solid source of heat are fed per pound of carbonaceous material entering the fast fluidized bed. The solids employed may be solids provided external to the process such as sand or the solid product resulting from pyrolysis of the carbonaceous material, such as char or coke, or, in the instance of municipal solid waste, the glass-like inorganic residue resulting from the decarbonization of the solid residue of pyrolysis. To achieve short contact time, the particulate source of heat is introduced to the fast fluidized bed at a temperature from about 100° to about 500° F or more above the desired pyrolysis temperature. The particulate source of heat serves to prevent agglomeration of the carbonaceous material and to provide the heat required for the endothermic pyrolysis reaction.

A portion of the heat required for pyrolysis can be supplied by the stripping gas stream 59 and the fluidization gas stream 61. These streams can be heated to the pyrolysis temperature or higher to reduce the heat load on the particulate source of heat.

The amount of gas employed to transport the solid carbonaceous material and the particulate source of heat and to fluidize the particulate source of heat is sufficient to maintain transport of the materials and avoid plugging, and is normally in excess of that amount to dilute the solids materials and minimize pyrolysis contact time. Normally the solids content of a combined stream of the carbonaceous materials plus the particulate source of heat to gas is from about 0.1 to about 10% by volume based on the total volume of the stream.

Stripping gas ascending through the dense fluidized mass passes out of the pyrolysis reactor through a vent 62 projecting out of the domed top 16. The vented gas is released to the atmosphere after its heating value is recovered, or can be cycled back to to the pyrolysis reaction zone 10 as fluidization or carrier gas.

At the bottom of the pyrolysis reactor below the fast fluidized bed, particulate source of heat and carbon containing solid residue not fluidizable in the fast fluidized bed 29 or the internally circulating fluidized bed are collected in the stripping chamber 18. These particles are contacted with a stripping gas stream 64 which is nondeleteriously reactive with respect to pyrolysis products to remove hydrocarbons which may have accumulated on the surface of these particles. The baffles 17 in the stripping chamber provide an even distribution of the stripping gas throughout the stripping chamber. The stripping gas flows upwards through the stripping chamber into the fast fluidized bed and the dense fluidized mass and exits the pyrolysis reactor 10 through the outlet 44 above the fast fluidized bed. Large chunks of solids are removed from the stripping chamber as required through the slide valve 24 and first solids outlet 20.

Smaller particles of the carbon containing solid residue and particulate source of heat which drop into the stripping chamber are removed from the reactor through screened outlet 46. These particles then pass from outlet 46 downward through a standpipe 65, past a slide valve 66, and then are transported along an angle riser 68 to a vertical riser 70 and into a combustion zone 72. Transporter lift gas is used to carry the solids through lines 68 and 70 into the combustion vessel 72. There is a deflector 74 above the outlet 76 from vertical riser 70 to uniformly distribute the solids in the combustion vessel 72.

In the combustion zone at least a portion of the solids are at least partially oxidized in the presence of a source of oxygen such as combustion air stream 78 to provide the particulate source of heat for the pyrolysis reaction. Due to this exothermic oxidation reaction the combustion zone is maintained at a temperature consonant with the operating temperature of the fast fluidized bed, and generally from about 100° F to 500° F above the pyrolysis temperature.

A flue gas stream 80 is withdrawn from the top of the combustion vessel. The stream contains the inert constituents of the source of oxygen such as nitrogen in the case of air, the products of combustion such as carbon dioxide, and the lift gas. This flue gas stream 80 may be flared and vented to the atmosphere, or may be utilized as the fluidization or carrier gas used in the pyrolysis reaction zone.

As required, the particulate source of heat is passed down through a standpipe 82 through a slide valve 84 and an angle riser 86 for feed to the base of the fast fluidized bed. A transporter lift gas stream nondeleteriously reactive with respect to pyrolysis products is used to convey the particulate source of heat to the pyrolysis reactor 10. Excess solids in the combustion zone, which represent the net solid product of the pyrolysis reaction, are withdrawn from the combustion vessel 72 through line 90.

The overhead collection hood 42 above the fast fluidized bed 20 is preferably smaller in diameter than the diameter of the duct 26 surrounding the fast fluidized bed. Thus, the solids in the internally circulating fluidized bed are not withdrawn from the pyrolysis reactor. Rather, a stream 91 containing gas and entrained solids from the central portion of the fast fluidized bed is collected by the hood 40 and withdrawn from the pyrolysis reactor through outlet 44. The gas in stream 91 contains pyrolytic vapors comprising hydrocarbons, inert carrier and stripping gases, undesirable components such as hydrogen sulfide which may be generated in the pyrolysis reaction, and hydrogen and carbon dioxide generated by the water-gas shift reaction if water or steam is injected into the pyrolysis reaction zone. The entrained solids mixture includes particulate source of heat and carbon containing solid residue.

The gases in line 44 are separated from the entrained solids in a gas solid separation zone such as cyclone 92. In order to obtain an efficient separation in the cyclone 92 it is necessary that the gases and entrained solids in line 44 enter the cyclone at a velocity of from about 60 feet to about 200 feet per second. This velocity is attained by a large reduction in cross-sectional area for gas flow due to the necking down of the hood 42 above the fast fluidized bed to the comparatively small diameter of line 44. The necking down of the hood also serves to minimize the residence time of the volatilized hydrocarbons in the pyrolysis reactor to minimize degradation of the hydrocarbon product by cracking.

Gases separated in the cyclone 92 are withdrawn from the top of the cyclone through line 94 and transferred to quench and recovery operations (not shown). In the quench operation the gases are contacted with a quench fluid to reduce gas temperature at least below pyrolysis and cracking temperatures to prevent further cracking reactions from occurring. A portion of the heavier hydrocarbons formed in the pyrolysis reaction may be employed as the quench fluid. In the recovery operation, condensible volatilized hydrocarbons are then separated and recovered by conventional separation and recovery means such as venturi scrubbers, indirect heat exchangers, wash towers and the like. The undesirable gaseous product can be removed from the uncondensible hydrocarbons by conventional means such as chemical scrubbing. The remaining uncondensed hydrocarbons can be sold as a product gas and can be utilized as fluidization gas and carrier gas for carrying the carbonaceous material and the particulate source of heat to the pyrolysis reaction zone 10.

The entrained solids mixture separated in the cyclone 92 is returned to the pyrolysis reactor, preferably to the dense fluidized mass so as not to interfere with the upward flow of pyrolytic vapors from the fast fluidized bed, through a dipleg 96 extending through the domed top 16 of the reactor from the bottom of the cyclone 92.

The process and apparatus of this invention are particularly useful for agglomerative coals because caking of the coal is prevented by fast moving solid particles passing along the reactor wall. Also, self-agglomeration of the coal particles is prevented because there is rapid and thorough mixing of the feed coal and the large amount of heat carrier particles utilized. Caking on the hood above the fast fluidized bed does not occur with agglomerative coals because the coal particles pass through the tacky state in the fast fluidized bed before impinging on the hood. Furthermore, this invention results in high yields of middle distillate hydrocarbons from coal because of the short residence time in the fast fluidized bed of the pyrolysis reactor.

Although the process and apparatus of this invention are described in terms of certain versions thereof, other versions of this invention are obvious to those skilled in the art. For example, hydrogen gas can be added to the pyrolysis reactor for hydrogenating the volatilized hydrocarbons resulting from the pyrolysis of the carbonaceous material to upgrade their value. Because of variations such as these, the spirit and scope of the appended claims should not necessarily be limited to the description of the version described above.

What is claimed is:

1. In a process for the pyrolysis of solid carbonaceous materials in which the carbonaceous material is pyrolyzed by heat transferred thereto from a high temperature, particulate solid source of heat to yield as products of pyrolysis a pyrolytic vapor containing hydrocarbons and a particulate carbon containing solid residue, an improved method of achieving pyrolysis comprising the steps of:

a. simultaneously introducing upwardly to the base of an upwardly flowing fast fluidized bed contained within a substantially vertically disposed open duct, said open duct at least partially surrounded by a descending dense fluidized mass of particulate solids including particulate carbon containing solid residue of pyrolysis and spent particulate source of heat, a particulate carbonaceous material contained in a carrier gas which is nondeleteriously reactive with respect to the products of pyrolysis and a particulate source of heat to contact and pyrolyze the carbonaceous material, the introduced quantity of particulate solid source of heat being sufficient to raise the carbonaceous material to a pyrolysis temperature of at least about 600° F to yield as products of pyrolysis pyrolytic vapor and particulate carbon containing solid residue, while simultaneously maintaining a flow of solids from the surrounding dense fluidized mass upwardly along the inner surface of the duct to prevent contact of the carbonaceous material with the inner surface of the duct;

b. discharging (i) at least a portion of the spent particulate source of heat and particulate carbon containing solid residue resulting from pyrolysis over the top end of the open duct to the descending dense fluidized mass of particulate solids and (ii) a stream comprising a gaseous mixture of carrier gas, pyrolytic vapor and entrained particulate solids including spent particulate solid source of heat and carbon containing solid residue from the upper portion of the duct and through an outlet above the fluidized bed;

c. separating the entrained solids from the gaseous mixture in a separation zone; and d. recovering hydrocarbon values from the gaseous mixture.

2. A process as claimed in claim 1 in which the duct is cylindrical.

3. The process of claim 1 in which the weight ratio of the particulate solid source of heat introduced into the base of the fast fluidized bed to carbonaceous material is from about 2 to about 20:1.

4. The process of claim 1 in which the weight ratio of the fluidized solids mixture passing upwards along the inner surface of the duct to carbonaceous material introduced to the fast fluidized bed is from about 6 to about 40:1.

5. A process as claimed in claim 1 having a pyrolysis time of less than about 5 seconds.

6. The process of claim 1 having a pyrolysis time of from about 0.1 to about 3 seconds.

7. The process of claim 1 in which the pyrolysis temperature is from about 900° to about 1400° F.

8. A process as claimed in claim 1 in which the dense fluidized mass is maintained around the duct by contacting the spent particulate source of heat and particulate carbon containing solid residue discharged over the top end of the duct with an ascending stream of a stripping gas which is nondeleteriously reactive with respect to pyrolysis products.

9. A process as claimed in claim 1 comprising the additional step of withdrawing particulate source of heat and particulate carbon containing solid residue through an outlet located below the fast fluidized bed, and subjecting at least a portion of the withdrawn particulates to at least partial oxidation in the presence of a source of oxygen to form the particulate source of heat.

10. A process as claimed in claim 1 comprising the additional step of transferring entrained solids from the separation zone to the pyrolysis reaction zone.

11. A process as claimed in claim 1 comprising the additional step of heating the dense fluidized mass.

12. The process of claim 1 in combination with the steps of:

a. collecting solids comprising carbon containing solid residue in a stripping zone below the fast fluidized bed;

b. stripping hydrocarbons from the solids in the stripping zone with a stripping gas which is nondeleteriously reactive with respect to pyrolysis products; and c. withdrawing stripped solids from the stripping zone.

13. The process of claim 1 in which the step of maintaining a flow of solids along the inner surface of the duct comprises discharging into the base of the duct upwardly along the inner surface of said duct a fluidizing gas which is nondeleteriously reactive with respect to pyrolysis products.

14. A process for pyrolysis of carbonaceous materials comprising the steps of:

a. simultaneously introducing through first and second solids inlets which are coaxial only at their terminal portions to the base of an upwardly flowing fast fluidized bed contained within a substantially vertically disposed, open, cylindrical dust surrounded by a descending dense fluidized mass of particulate solids including particulate carbon containing solid residue and spent particulate source of heat maintained fluidized by an ascending stream of a stripping gas which is nondeleteriously reactive with respect to pyrolysis products, a particulate carbonaceous material contained in a carrier gas which is nondeleteriously reactive with respect to the products of pyrolysis and a particulate source of heat to contact and initiate pyrolysis of the carbonaceous material to yield in a pyrolysis time of from about 0.1 to about 5 seconds as products of pyrolysis pyrolytic vapor and particulate carbon containing solid residue, the weight ratio of the particulate source of heat to carbonaceous material being from about 2 to about 20:1 and the temperature of the particulate source of heat being sufficient to raise carbonaceous material to a pyrolysis temperature of from about 600° to about 1400° F, while simultaneously maintaining a flow of solids from the surrounding dense fluidized mass upwardly along the inner surface of the duct to prevent contact of the carbonaceous material with the inner surface of the duct by discharging into the base of the duct upwardly along the inner surface of said duct a fluidizing gas which is nondeleteriously reactive with respect to pyrolysis products;

b. discharging (i) a portion of the particulate source of heat and particulate carbon containing solid residue resulting from pyrolysis over the top edge of the duct to the descending dense fluidized mass of particulate solids and (ii) a stream comprising a gaseous mixture of carrier gas, pyrolytic vapors, and entrained particulate solids including spent particulate solid source of heat and carbon containing solid residue from the top portion of the duct and through an outlet above the fluidized bed and separating the entrained solids from the gaseous mixture in a cyclone separation zone;

c. recovering hydrocarbons from the gaseous mixture; and d. cycling the separated entrained solids from the separation zone to the dense fluidized mass.

15. The process of claim 14 in which the weight ratio of the fluidized solids mixture passing upwards along the inner surface of the duct to carbonaceous material introduced to the fast fluidized bed is from about 6 to about 40:1.

16. The process of claim 14 in which the pyrolysis time is about 0.1 to about 3 seconds.

17. A process for pyrolysis or carbonaceous materials comprising the steps of:
   a. simultaneously introducing to the base of upwardly flowing fast fluidized bed contained within a substantially vertically disposed, open, cylindrical duct surrounded by a descending dense fluidized mass of particulate solids including particulate carbon containing solid residue comprising char and spent particulate source of heat maintained fluidized by an ascending stream of a stripping gas which is nondeleteriously reactive with respect to the products of pyrolysis and a particulate source of heat to contact and initiate pyrolysis of the carbonaceous material to yield within a pyrolysis time of from about 0.1 to about 5 seconds as products of pyrolysis pyrolytic vapor and particulate carbon containing solid residue comprising char, the weight ratio of the particulate source of heat to coal being from about 2 to about 20:1 and the temperature of the particulate source of heat being sufficient to raise the coal to a pyrolysis temperature of from about 600° to about 1400° F, while simultaneously maintaining a flow of solids surrounding dense fluidized mass upwardly along the inner surface of the duct to prevent contact of the agglomerative coal with the inner surface of the duct by discharging into the base of the duct upwardly along the inner surface of said duct a fluidizing gas which is nondeleteriously reactive with respect to pyrolysis products;
   b. discharging (i) a portion of the particulate source of heat and particulate carbon containing solid residue resulting from pyrolysis over the top edge of the duct to the descending dense fluidized mass of particulate solids and (ii) a stream comprising a gaseous mixture of carrier gas, pyrolytic vapors, and entrained particulate solids including spent particulate solid source of heat and carbon containing solid residue from the top portion of the duct and through an outlet above the fluidized bed and separating the entrained solids from the gaseous mixture in a cyclone separation zone;
   c. recovering hydrocarbons from the gaseous mixture;
   d. cycling the separated entrained solids from the separation zone to the dense fluidized mass;
   e. collecting solids comprising carbon containing solid residue in a stripping zone below the fast fluidized bed;
   f. stripping hydrocarbons from the solids in the stripping zone with a stripping gas which is nondeleteriously reactive with respect to pyrolysis products; and
   g. withdrawing stripped solids from the stripping zone.

18. A reactor for pyrolysis of solid carbonaceous materials comprising:
   a. an open, substantially vertically disposed duct having a first vertically oriented solids inlet and a second vertically oriented solids inlet positioned at the base thereof in open communication therewith and laterally spaced therefrom;
   b. a gas inlet around the first and second solids inlet and in open communication with the base of said duct;
   c. a vertically oriented outer vessel enclosing said duct in spaced relationship therefrom to form a substantially vertically disposed passageway therebetween;
   d. means for introducing a particulate carbonaceous material to undergo pyrolysis upwardly through the first solids inlets;
   e. means for introducing a particulate source of heat upwardly through the second solids inlet to pyrolyze the carbonaceous material to yield as products of pyrolysis pyrolytic vapor and carbon containing solids residue; and
   f. means for introducing a fluidizing gas to the gas inlet to fluidize a layer of particulate solids including the particulate source of heat moving along the inner surface of the duct, the solids entering the duct at the base thereof from the passageway between the duct and the outer vessel; and
   g. means for removing pyrolytic vapor and means for removing carbon containing solid residue from the outer vessel.

19. A reactor as claimed in claim 18 comprising in addition means for introducing a stripping gas to flow upwardly through the passageway to fluidize solids descending through the passageway between the duct and the outer vessel towards the base of the duct to be fluidized therein by the fluidizing gas introduced to the gas inlet.

20. A reactor as claimed in claim 18 including:
   a. a stripping chamber below the duct in open communication therewith for receiving solids therefrom;
   b. an inlet for a stripping gas into the chamber; and
   c. an outlet for withdrawing solids from the stripping chamber.

21. A reactor as claimed in claim 18 in which the duct is cylindrical.

22. A reactor as claimed in claim 18 in which the first solids inlet is a first conduit and the second solids inlet is a passageway between the outer wall of the first conduit and the inner wall of a second conduit which surrounds the first conduit only at the terminal portion of the first conduit.

23. A reactor as claimed in claim 18 in which the first and second conduits are cylindrical and coaxial.

24. A reactor as claimed in claim 18 in which the ratio of the diameter of the duct to the diameter of the solids inlet for the particulate carbonaceous material is from about 5:1 to about 10:1.

25. An apparatus for pyrolysis of solid carbonaceous materials comprising:
   a. an open, vertically disposed cylindrical duct having a first and a second vertically oriented solids inlet positioned at the base thereof in open communication therewith and laterally spaced therefrom, wherein the first solids inlet comprises a tube and the second solids inlet comprises an annular region surrounding the tube only at the end portion of the tube;
   b. a fluidizing gas inlet surrounding the first and second solids inlet in open communication with the base of said duct;

c. a vertically oriented outer vessel enclosing said duct in spaced relationship therefrom to form a vertically disposed passageway therebetween;

d. means for introducing a particulate carbonaceous material to undergo pyrolysis upwardly through the first solids inlet;

e. means for introducing a particulate source of heat upwardly through the second solids inlet to pyrolyze the carbonaceous material introduced through the first solids inlet to yield as products of pyrolysis pyrolytic vapor containing hydrocarbons and carbon containing solid residue;

f. means for introducing fluidizing gas to the gas inlet to fluidize a layer of particulate solids containing carbon containing solid residue and spent particulate source of heat moving along the inner surface of the duct, the solids entering the duct at the base thereof from the passageway between the duct and the outer vessel;

g. outlet means above the duct for removal of pyrolytic vapor and entrained solids from the outer vessel; and h. a solids outlet below the duct for withdrawal of carbon containing solid residue.

26. An apparatus as claimed in claim 25 comprising in addition:

a. means for separating the pyrolytic vapor from the entrained solids removed through the outlet above the duct; and b. connection means from the outlet above the duct to the separation means.

27. An apparatus as claimed in claim 26 comprising in addition means for transferring entrained solids separated in the separation means from the separation means to the passageway.

28. An apparatus as claimed in claim 25 including:

a. a stripping chamber below the duct and in open communication therewith for receiving particulate carbon containing solid residue from the duct;

b. means for passing a stripping gas through the stripping chamber; and c. outlet means for withdrawing stripped particles from the bottom of the stripping chamber.

29. An apparatus as claimed in claim 25 comprising in addition:

a. a combustion chamber for at least partially oxidizing the withdrawn carbon containing solid residue to form a particulate source of heat;

b. means for passing a source of oxygen into the combustion chamber;

c. means for transferring the withdrawn solids to the combustion chamber; and d. means for transferring the particulate source of heat to the first solids inlet.

30. An apparatus as claimed in claim 25 in which the outlet means comprises a vertically oriented hood tapering inwardly away from the duct.

31. A reactor as claimed in claim 25 in which the ratio of the diameter of the duct to the diameter of the solid inlet for the particulate carbonaceous material is from about 5:1 to about 10:1.

32. An apparatus for pyrolysis of agglomerative coals comprising:

a. an open, substantially vertically disposed cylindrical duct having a first and second solids inlet positioned at the base thereof in open communication therewith and laterally spaced therefrom, wherein the first solids inlet comprises a vertically disposed tube and the second solids inlet comprises an annular passageway between the first tube and a second vertically disposed tube coaxial with and surrounding the first tube only at the terminus portion of the first tube;

b. a fluidizing gas inlet around the first and second solids inlet and in open communication with the base of said duct;

c. a vertically oriented outer vessel enclosing said duct in spaced relationship therefrom to form a vertically disposed passageway therebetween;

d. a stripping gas inlet in open communication wiht the base of said passageway.

e. means for introducing a particulate carbonaceous material to undergo pyrolysis upwardly through the first solids inlet;

f. means for introducing a particulate source of heat upwardly through the second solids inlet to pyrolyze the carbonaceous material to yield as products of pyrolysis pyrolytic vapors containing hydrocarbons and carbon containing solid residue;

g. means for introducing fluidizing gas to the fluidizing gas inlet to fluidize a layer of particulate solids moving along the inner surface of the duct, the solids entering the duct at the base thereof from the passageway between the duct and the outer vessel;

h. means for introducing a stripping gas to the stripping gas inlet to fluidize solids descending through the passageway between the duct and the outer vessel towards the base of the duct to be fluidized by the fluidizing gas introduced to the fluidizing gas inlet;

i. outlet means above the duct for removal of pyrolytic vapor and entrained solids from the outer vessel comprising a vertically oriented duct tapering inwardly away from the duct;

j. means for separating the pyrolytic vapor from the entrained solids;

k. connection means from an outlet above the duct to the separation means;

l. means for transferring entrained solids separated in the separation means from the separation means to the passageway between the duct and the outer vessel;

m. a stripping chamber below and in open communication with the duct into which particulate carbon containing solid residue passes;

n. means for passing a stripping gas through the stripping chamber; and o. means for withdrawing particles from the stripping chamber.

33. A process as claimed in claim 1 in which the particulate carbonaceous material and the particulate source of heat are introduced to the base of the fast fluidized bed through first and second solids inlets which are coaxial only at their terminal portions.

34. A process as claimed in claim 33 in which the particulate carbonaceous material is introduced to the fast fluidized bed through the first solids inlet and the particulate source of heat is introduced to the fast fluidized bed through the second solids inlet, wherein the first solids inlet comprises a vertically disposed conduit and the second solids inlet comprises a passageway surrounding the conduit.

* * * * *